United States Patent
Andrews et al.

(10) Patent No.: US 8,440,281 B2
(45) Date of Patent: May 14, 2013

(54) STABILIZED BLENDS OF POLYESTER AND POLYAMIDE

(75) Inventors: Stephen M. Andrews, New Fairfield, CT (US); Paul A. Odorisio, Leonia, NJ (US); Yijun Ye, Solon, OH (US)

(73) Assignee: BASF SE, Ludwigshafen (DE)

( * ) Notice: Subject to any disclaimer, the term of this patent is extended or adjusted under 35 U.S.C. 154(b) by 555 days.

(21) Appl. No.: 12/721,777

(22) Filed: Mar. 11, 2010

(65) Prior Publication Data

US 2010/0233405 A1 Sep. 16, 2010

Related U.S. Application Data

(60) Provisional application No. 61/210,011, filed on Mar. 13, 2009.

(51) Int. Cl.
| | |
|---|---|
| *B29D 22/00* | (2006.01) |
| *B29D 23/00* | (2006.01) |
| *B32B 1/08* | (2006.01) |
| *B65D 1/02* | (2006.01) |

(52) U.S. Cl.
USPC ....... 428/36.92; 428/35.7; 527/323; 527/115; 527/107; 527/217; 527/222; 527/291; 527/189; 527/289; 527/117; 527/151; 527/125; 527/111

(58) Field of Classification Search ............... 428/36.92, 428/35.7; 524/323, 115, 107, 217, 222, 291, 524/189, 289, 117, 151, 125, 111
See application file for complete search history.

(56) References Cited

U.S. PATENT DOCUMENTS

| | | | |
|---|---|---|---|
| 5,985,389 A | 11/1999 | Dalton et al. | |
| 6,733,853 B2 | 5/2004 | Takashima et al. | |
| 7,049,359 B2 | 5/2006 | Cochran et al. | |
| 7,358,324 B2 | 4/2008 | Chen et al. | |
| 2003/0004244 A1 | 1/2003 | Al-Malaika | |
| 2004/0013833 A1 | 1/2004 | Lee et al. | |
| 2004/0220300 A1 | 11/2004 | Valentine et al. | |
| 2005/0176859 A1 | 8/2005 | Tinkl et al. | |
| 2005/0222345 A1 | 10/2005 | Makayama et al. | |
| 2008/0009574 A1 | 1/2008 | Huenfeld et al. | |
| 2008/0064796 A1 | 3/2008 | Bourgeous et al. | |
| 2009/0054567 A1 | 2/2009 | Heater | |
| 2009/0054601 A1 | 2/2009 | Elliott et al. | |
| 2009/0062443 A1 | 3/2009 | Kemmish et al. | |

FOREIGN PATENT DOCUMENTS

| | | |
|---|---|---|
| DE | 19855598 | 6/1999 |
| GB | 1230027 | 4/1971 |
| JP | 2004149608 | 5/2004 |
| WO | 03010370 | 2/2003 |
| WO | 2007072067 | 6/2007 |

*Primary Examiner* — Michael C Miggins

(74) *Attorney, Agent, or Firm* — Tyler A. Stevenson

(57) ABSTRACT

Disclosed are stabilized blends of polyester and polyamide. The polymer blends are stabilized with A) a combination of stabilizers a) acetaldehyde scavengers and b) stabilizers selected from phenolic antioxidants, organic phosphorus stabilizers and lactone stabilizers or B) a combination of c) lactone stabilizers and d) stabilizers selected from phenolic antioxidants and organic phosphorus stabilizers. The present blends exhibit reduced color formation, a high level of whiteness/brightness and acceptably low haze formation upon heat treatment. The blends are useful to make bottles, containers and films for drinks, food and cosmetics and the like. The polyester is in particular polyethylene terephthalate, PET, and the polyamide is in particular polyamide-MXD6. Heat treatment is for example melt extrusion or solid state polymerization, SSP.

19 Claims, No Drawings

STABILIZED BLENDS OF POLYESTER AND POLYAMIDE

This application claims benefit of U.S. app. No. 61/210,011, filed Mar. 13, 2009, the contents of which are incorporated by reference.

Disclosed are stabilized blends of polyester and polyamide. The polymer blends are stabilized with A) a combination of a) acetaldehyde scavengers and b) stabilizers selected from phenolic antioxidants, organic phosphorus stabilizers and lactone stabilizers or B) a combination of c) lactone stabilizers and d) stabilizers selected from phenolic antioxidants and organic phosphorus stabilizers. The present blends exhibit reduced color formation, a high level of whiteness/brightness and acceptably low haze formation upon heat treatment. The polyester is in particular polyethylene terephthalate, PET, and the polyamide is in particular polyamide-MXD6.

WO 2007/072067 discloses the stabilization of polyester compositions comprising a property improving material.

U.S. 2004/0013833 is aimed at compatibilized polymer blends comprising polyester, polyamide and a compatibilizer.

U.S. 2008/0009574 teaches polyamide-polyester barrier blends.

U.S. 2008/0064796 is aimed at polymer recyclates.

U.S. Pat. No. 7,049,359 is aimed at packaging materials.

U.S. Pat. No. 6,733,853 is aimed at polyester-based resin compositions.

U.S. 2005/0222345 discloses polyester/polyamide compositions comprising an alkali metal atom and a phosphorus atom.

U.S. Pat. No. 7,358,324 teaches a method for producing compositions with improved gas barrier properties.

U.S. 2009/0054601 teaches articles comprising polyester/polyamide blends.

U.S. 2009/0054567 discloses an ionomeric polyester comprising certain oxidizable phosphorus compounds.

U.S. patents and published applications discussed herein are incorporated by reference.

Thermoplastic polyester containers as produced for instance through stretch blow molding have various excellent properties including good transparency, good mechanical properties and good flavor barrier properties and are sanitary and safe for daily use. Therefore they have many applications for instance as beverage and food rigid containers. However, as their gas barrier properties are not always satisfactory, drinks, foods and the like in them could only be stored for a relatively short period of time.

In order to achieve extended shelf life of polyester (PES) containers by improving barrier and mechanical properties, various methods of combining a thermoplastic polyester with a polyamide or nylon barrier resin such as nylon MXD6 has been proposed.

There is a need to improve the level of discoloration and haze that is formed upon heat treatment of blends of polyester and polyamide.

It has surprisingly been discovered that certain additive combinations can provide polyester-polyamide blends with outstanding resistance to color and haze formation upon melt heat treatment (heat processing).

SUMMARY

Disclosed are polymer blend compositions susceptible to color and haze formation upon heat processing comprising
at least one polyester and at least one polyamide and
A) a combination of
  a) one or more compounds selected from aldehyde scavengers and
  b) one or more compounds selected from phenolic antioxidants, organic phosphorus stabilizers and lactone stabilizers or
B) a combination of
  c) one or more lactone stabilizers and
  d) one or more compounds selected from phenolic antioxidants and organic phosphorus stabilizers.

Also disclosed is a process for stabilizing polymer blends against color and haze formation upon heat processing, said process comprising
melt blending a mixture of at least one polyester and at least one polyamide and
A) a combination of
  a) one or more compounds selected from aldehyde scavengers and
  b) one or more compounds selected from phenolic antioxidants, organic phosphorus stabilizers and lactone stabilizers or
B) a combination of
  c) one or more lactone stabilizers and
  d) one or more compounds selected from phenolic antioxidants and organic phosphorus stabilizers.

DETAILED DISCLOSURE

Polyesters and Polyamides

The polyesters and polyamides are known and are for example as disclosed in U.S. 2004/0013833, U.S. 2008/0009574 and U.S. 2007/0093616, the contents of which disclosures are incorporated by reference.

Preferred thermoplastic polyesters include, but are not limited to, condensed polymers that comprise an aromatic dicarboxylic acid or its alkyl ester and a diol. Suitable resins include a polyester resin including or consisting essentially of an ethylene terephthalate component. In one embodiment, it is desirable that the total proportion (mol %) of terephthalic acid units and ethylene glycol units constituting a preferred polyester is at least about 70 mol % relative to the total moles of all constituent units that constitute said polyester, more preferably at least about 90 mol %. Such an embodiment is suitable for most applications, and is especially suitable for hot fill applications. If the total proportion of terephthalic acid units and ethylene glycol units constituting the preferred polyester is smaller than about 70 mol %, the copolyester will be amorphous. When hot filled, stretched containers that comprise such an amorphous copolyester are more susceptible to heat shrinkage, and may have poor heat resistance and lower strength.

A polyester resin, including, but not limited to those discussed above, may be optionally copolymerized with any other bifunctional compound units except terephthalic acid units and ethylene glycol units, within the range not significantly interfering with the properties needed or desired for the container or preform. In the embodiment discussed above, the proportion (mol %) of the additional units is preferably at most about 30 mol % relative to the total moles of all constituent units that constitute the polyester, more preferably at most 20 mol %, even more preferably at most 10 mol %. Preferred bifunctional compound units that may be in the resin include dicarboxylic acid units, diol units and hydroxycarboxylic acid units. Other bifunctional compounds are also employable for the purpose, including, for example, aliphatic bifunctional compound units, alicyclic bifunctional compound units and aromatic bifunctional compound units.

Examples of preferred aliphatic bifunctional compound units, include, but are not limited to, divalent structure units to be derived from aliphatic dicarboxylic acids and their ester-forming derivatives, such as malonic acid, succinic acid, adipic acid, azelaic acid and sebacic acid; from aliphatic hydroxycarboxylic acids and their ester-forming derivatives, such as 10-hydroxyoctadecanoic acid, lactic acid, hydroxyacrylic acid, 2-hydroxy-2-methylpropionic acid and hydroxybutyric acid, and from aliphatic diols such as 2-butene-1,4-diol, trimethylene glycol, tetramethylene glycol, hexamethylene glycol, neopentyl glycol, methylpentanediol and diethylene glycol. Neopentyl glycol units are preferred aliphatic bifunctional compound units, since copolyesters comprising the units do not lower the heat resistance of the multi-layered containers comprising them and are easy to produce.

Examples of alicyclic bifunctional compound units include, but are not limited to, divalent structure units to be derived from alicyclic dicarboxylic acids and their ester-forming derivatives, such as cyclohexanedicarboxylic acid, norbornenedicarboxylic acid and tricyclodecanedicarboxylic acid; alicyclic hydroxycarboxylic acids and their ester-forming derivatives such as hydroxymethylcyclohexane-carboxylic acid, hydroxymethylnorbornenecarboxylic acid and hydroxymethyltricyclodecanecarboxylic acid; and alicyclic diols such as cyclohexanedimethanol, norbornenedimethanol and tricyclodecanedimethanol. Cyclohexanedimethanol units or cyclohexanedicarboxylic acid units are preferred alicyclic bifunctional compound units, since copolyesters comprising them are easy to produce. Further, these units improve the drop-impact strength of the containers and greatly improve the transparency thereof.

The cyclohexanedimethanol unit as referred to herein is meant to indicate at least one divalent unit selected from 1,2-cyclohexanedimethanol units, 1,3-cyclohexanedimethanol units and 1,4-cyclohexanedimethanol units. The cyclohexanedicarboxylic acid unit also referred to herein is to indicate at least one divalent unit selected from 1,2-cyclohexanedicarboxylic acid units, 1,3-cyclohexanedicarboxylic acid units and 1,4-cyclohexanedicarboxylic acid units. Of the alicyclic bifunctional compound units noted above, more preferred are 1,4-cyclohexanedimethanol units and 1,4-cyclohexanedicarboxylic acid units, since they are easily available and since copolyesters comprising them and even moldings from such copolyesters could have higher drop-impact strength.

Preferred aromatic bifunctional compound units may be any of aromatic dicarboxylic acid units, aromatic hydroxycarboxylic acid units and aromatic diol units. Examples include, but are not limited to, divalent units to be derived from aromatic dicarboxylic acids except terephthalic acid and their ester-forming derivatives, such as isophthalic acid (IPA), phthalic acid, biphenyldicarboxylic acid, diphenyl ether-dicarboxylic acid, diphenyl sulfone-dicarboxylic acid, diphenyl ketone-dicarboxylic acid, sodium sulfoisophthalate, 2,6-naphthalenedicarboxylic acid, 1,4-naphthalenedicarboxylic acid and 2,7-naphthalenedicarboxylic acid; aromatic hydroxycarboxylic acids and their ester-forming derivatives, such as hydroxybenzoic acid, hydroxytoluic acid, hydroxynaphthoic acid, 3-(hydroxyphenyl)propionic acid, hydroxyphenylacetic acid and 3-hydroxy-3-phenylpropionic acid, and aromatic diols such as bisphenol compounds and hydroquinone compounds. At least one of isophthalic acid units, phthalic acid units, naphthalenedicarboxylic acid units and 4,4'-biphenyldicarboxylic acid units are preferred as the aromatic dicarboxylic acid units for bifunctional compound units, since copolyesters comprising them are easy to produce and since the monomer costs for them are low.

In particular, isophthalic acid (IPA) is advantageous in that the moldability of copolyesters comprising IPA is good. Further these IPA copolyesters exhibit a broad range of molding conditions resulting in good moldings and a low percentage of failed moldings. In addition, the acid is further advantageous in that it retards the crystallization rate of the copolyesters comprising it thereby preventing the whitening of the copolyester molding.

Naphthalenedicarboxylic acid is also advantageous in that it increases the glass transition point of copolyesters comprising it and even increases the heat resistance of containers comprising the copolyesters. In addition, naphthalenedicarboxylic acid-copolymerized polyesters absorb UV rays, and are therefore preferably used in producing containers that are desired to be resistant to UV rays. For the purpose of protecting the contents of containers from UV rays, it is desirable that the thermoplastic polyester to be used for producing the containers has a naphthalenedicarboxylic acid component in an amount of from 0.1 to 15 mol %, more preferably from 1.0 to 10 mol %, but also including about 0.5, 2, 3, 4, 5, 6, 7, 8, 9, 10.5 mol % relative to the sum total of all dicarboxylic acid components constituting it. 2,6-naphthalenedicarboxylic acid component is preferred as naphthalenedicarboxylic acid, since copolyesters comprising it are easy to produce and since the monomer cost for it is low.

Examples of suitable aromatic bifunctional compound units include, but are not limited to, diol units to be derived from 2,2-bis(4-(2-hydroxyethoxy)phenyl)propane, 2-(4-(2-(2-hydroxyethoxy)-ethoxy)phenyl)-2-(4-(2-hydroxyethoxy) phenyl)propane, 2,2-bis(4-(2-(2-hydroxyethoxy)ethoxy) phenyl)propane, bis(4-(2-hydroxyethoxy)phenyl)sulfone, (4-((2-hydroxyethoxy)ethoxy)phenyl)-(4-(2-hydroxyethoxy)phenyl)sulfone, 1,1-bis(4-(2-hydroxyethoxy)phenyl) cyclohexane, 1-(4-(2-(2-hydroxyethoxy)ethoxy)ethoxy)phenyl)-1-(4-(2-hydroxyethoxy)phenyl)-cyclohexane, 1,1-bis (4-(2-(2-hydroxyethoxy)ethoxy)phenyl)cyclohexane, 2,2-bis(4-(2-hydroxyethoxy)-2,3,5,6-tetrabromophenyl) propane, 1,4-bis(2-hydroxyethoxy)benzene, 1-(2-hydroxyethoxy)-4-(2-(2-hydroxyethoxy)ethoxy)benzene or 1,4-bis(2-(2-hydroxyethoxy)ethoxy)benzene. Of those diol units mentioned above, preferred are 2,2-bis(4-(2-hydroxyethoxy)phenyl)propane units, bis(4-(2-hydroxyethoxy)phenyl)sulfone units and 1,4-bis(2-hydroxyethoxy)benzene units, since polyester resins comprising any of those diol units are easy to produce while having good melt stability. Further, moldings from such resins have good color tone and good impact resistance.

Suitable polyester resins for the thermoplastic polyester layer of certain embodiments may have one or more bifunctional compound units including, but not limited to, those mentioned above. Resins containing such monomers in addition to terephthalic acid are referred to herein as PET-containing copolymers. Preferred polyester resins may contain a small amount of diethylene glycol units from diethylene glycol, which is a dimer of an ethylene glycol component and is formed as a minor by-product in the process of producing the polyester resin. Because of potential problems involving factors such as glass transition point, heat resistance, mechanical strength and color tone of moldings such as bottles, it is preferred that the proportion of the diethylene glycol units in the polyester resin be kept relatively low. Accordingly, in a preferred embodiment, the proportion of the diethylene glycol units in the polyester resin is smaller than 3 mol %, including 1 and 2 mol %, relative to the total moles of all constituent units of the polyester resin.

Polyester resins used in accordance with a preferred embodiment may be optionally copolymerized with polyfunctional compound units, including, but not limited to, those preferably derived from at least one polyfunctional compound having at least three groups selected from carboxyl groups, hydroxyl groups and their ester-forming groups. In one embodiment, the proportion of the polyfunctional compound units in the polyester resin are no more than 0.5 mol % relative to the total moles of all constituent units of the polyester. The polyfunctional compounds from which the polyfunctional compound units are derived may be any of polyfunctional compounds, including, but not limited to those having at least three carboxyl groups only, those having at least three hydroxyl groups only, and those having at least three carboxyl and hydroxyl groups in total. Suitable polyfunctional compound units, include, but are not limited to, those derived from aromatic polycarboxylic acids such as trimesic acid, trimellitic acid, 1,2,3-benzenetricarboxylic acid, pyromellitic acid and 1,4,5,8-naphthalenetetracarboxylic acid; aliphatic polycarboxylic acids such as 1,3,5-cyclohexanetricarboxylic acid; aromatic polyalcohols such as 1,3,5-trihydroxybenzene; aliphatic or alicyclic polyalcohols such as trimethylolpropane, pentaerythritol, glycerin and 1,3,5-cyclohexanetriol; aromatic hydroxycarboxylic acids such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid and 2,4-dihydroxyphenylacetic acid; aliphatic hydroxycarboxylic acids such as tartaric acid and malic acid; and their ester-forming derivatives.

A preferred polyester resin for the thermoplastic polyester layer of a preferred embodiment may comprise at least one polyfunctional compound unit such as, but not limited to, those mentioned above. Of those mentioned above, a preferred polyester resin preferably comprises at least one polyfunctional compound unit to be derived from trimellitic acid, pyromellitic acid, trimesic acid, trimethylolpropane and pentaerythritol, in view of the ease of producing the polyesters and the costs for their production. In addition, embodiments comprising such polyfunctional compound units may further comprise monofunctional compound units to be derived from at least one of monofunctional compounds such as, but not limited to, monocarboxylic acids, monoalcohols and their ester-forming derivatives. In embodiments including such monofunctional compound units, it is desirable that the proportion of the monofunctional compound units is at most about 5 mol %, more preferably at most about 1%, but also including about 2, 3, and 4%, relative to the total moles of all constituent units of the resin. Where the resin contains two or more different monofunctional compound units, the proportion indicates the total of all those units. Monofunctional compounds can be used to retard gellation when used at preferred concentrations. This is because gelling of the resin that satisfies the requirement is retarded in many cases. If the proportion of the monofunctional compound units is larger than about 5 mol %, the polymerization rate in producing the polyester resin, through melt or solid-phase polymerization, may be low which further unfavorably lowers the producibility of said polyester resin. In embodiments including monofunctional compound units, these units function as blocking compound units to block the terminal groups of the molecular chain or the terminal groups of the branched chains in the polyester resin, whereby the polyester resin is prevented from being too crosslinked and from being gelled. Preferred monofunctional compound units are not specifically defined, but preferably include, but are not limited to, those derived from at least one of monocarboxylic acids, monoalcohols and their ester-forming derivatives. Suitable monofunctional compound units, include, but are not limited to, units derived from monofunctional compounds, for example, aromatic monocarboxylic acids such as benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 2-naphthalenacetic acid and naphthalenacetic acid; aliphatic monocarboxylic acids such as n-octanoic acid, n-nonanoic acid, myristic acid, pentadecanoic acid, stearic acid, oleic acid, linolic acid and linolenic acid; ester-forming derivatives of those monocarboxylic acids; aromatic alcohols such as benzyl alcohol, 2,5-dimethylbenzyl alcohol, 2-phenethyl alcohol, phenol, 1-naphthol and 2-naphthol; and aliphatic or alicyclic monoalcohols such as pentadecyl alcohol, stearyl alcohol, polyethylene glycol monoalkyl ethers, polypropylene glycol monoalkyl ethers, polytetramethylene glycol monoalkyl ethers, oleyl alcohol and cyclododecanol.

A preferred polyester resin may comprise at least one of monofunctional compound units such as, but not limited to, those mentioned above. Of the monofunctional compound units mentioned above, those to be derived from one or more monofunctional compounds selected from benzoic acid, 2,4,6-trimethoxybenzoic acid, 2-naphthoic acid, stearic acid and stearyl alcohol are preferred for the polyesters for use in accordance with preferred embodiments, in view of the ease in producing the polyesters and of the costs for their production.

In view of its moldability, it is desirable that the thermoplastic polyester of a preferred embodiment comprises or consists essentially of an ethylene terephthalate component, otherwise known as polyethylene terephthalate or PET. The PET used in accordance with preferred embodiments may be copolymerized with suitable amounts of one or more comonomer components. It is desirable that the thus copolymerized polyester resin contains a comonomer component in an amount of from 1 to 6 mol %, relative to the total moles of all constituent units of the polyester, including about 1.5, 2, 2.5, 3, 3.5, 4, 4.5, 5 and 5.5 mol %. In consideration of the degree of copolymerization with diethylene glycol that may be produced as a by-product in the process of producing the resin, some other comonomers may be added to the resin so as to make the resin copolymerized with them within the range noted above. Such other comonomers are not specifically defined, for which any of the monomers mentioned above are usable. Some preferred monomers include, but are not limited to, neopentyl glycol, cyclohexanedimethanol (CHDM), cyclohexanedicarboxylic acid, isophthalic acid (IPA), and naphthalenedicarboxylic acid (NDC).

Preferred polyamides are preferably selected from the group of partially aromatic polyamides and can be formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. Preferred polyamides may also contain small amounts of trifunctional or tetrafunctional comonomers such as trimellitic anhydride, pyromellitic dianhydride, or other polyamide forming polyacids and polyamines known in the art. Preferred partially aromatic polyamides include, but are not limited to, poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide). One preferred partially aromatic polyamide is poly(m-xylylene adipamide) having a number average molecular weight of 7,000 to 39,000, including 9,000, 11,000, 13,000, 15,000, 17,000, 19,000, 21,000, 23,000, 25,000, 27,000, 29,000, 31,000, 33,000, 35,000 and 37,000, and/or an inherent viscosity of 0.6 to 0.9 dL/g, also including 0.65, 0.7, 0.75, 0.8, and 0.85 dL/g. Preferred aliphatic polyamides include, but are not limited to, poly(hexamethylene adipamide) and poly(caprolactam). The most preferred low molecular weight aliphatic polyamide is poly(hexamethylene adipamide) having a number average molecular weight of 13,000 to 16,000, but also including 13,500, 14,000, 14,500, 15,000 and 15,500, and/or an inherent viscosity of 0.7 to 0.9 dL/g, but also including 0.75, 0.8, and 0.85 dL/g.

Aliphatic and partially aromatic polyamides of preferred embodiments used in conjunction with polyester, uniformly decrease the acetaldehyde concentration in articles formed from such blends. Partially aromatic polyamides, however, are preferred over the aliphatic polyamides where clarity and dispersability are crucial.

Polyamides are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction should be carried out at a relatively low temperature, generally 80 to 120° C., until the ester is converted to an amide. The mixture is then heated to the polymerization temperature. In the case of polycaprolactam, either caprolactam or 6-aminocaproic acid can be used as a starting material and the polymerization may be catalyzed by the addition of adipic acid/hexamethylene diamine salt which results in a nylon 6/66 copolymer. When the diacid-diamine complex is used, the mixture is heated to melting and stirred until equilibration. The molecular weight is controlled by the diacid-diamine ratio. An excess of diamine produces a higher concentration of terminal amino groups which are available to react with acetaldehyde. If the diacid-diamine complex is prepared in a separate step, excess diamine is added prior to the polymerization. The polymerization can be carried out either at atmospheric pressure or at elevated pressures.

As presently contemplated a preferred polyamide is MXD6 available from Mitsubishi Gas Chemical (Japan). Also valuable are polyamide-6, polyamide-6,6, polyamide-6,12, polyamide-12, polyamide-11 and polyamide-4,6.

The preferred polyamide is the condensation product of adipic acid and m-xylylene diamine, or poly-m-xylylene adipamide, polyamide-MXD6.

Aldehyde Scavengers

Acetaldehyde (aldehyde) scavengers are known and are for example as disclosed in U.S. Pat. Nos. 6,762,275, 6,936,204 and 6,274,212, each incorporated by reference. Suitable aldehyde scavengers are also taught in U.S. Pat. Nos. 6,191,209 and 7,138,457, each incorporated by reference. Suitable aldehyde scavengers are also taught in U.S. 2005/0176859, incorporated by reference. The aldehyde scavengers are known additives for use in polyester.

Aldehyde scavengers are for instance anthranilamide, 1,8-diaminonaphthalene, allantoin, 3,4-diaminobenzoic acid, malonamide, salicylanilide, 6-amino-1,3-dimethyluracil, 6-aminoisocytosine, 6-aminouracil, 6-amino-1-methyluracil, α-tocopherol, triglycerin, trimethylolpropane, dipentaerythritol, tripentaerythritol, D-mannitol, D-sorbitol and xylitol. Further aldehyde scavengers are for example a dextrin or cyclodextrin.

The aldehyde scavenger is for example anthranilamide.

Aldehyde scavengers include those disclosed for instance in U.S. Pat. No. 6,790,499, incorporated by reference. Aldehyde scavengers are for instance polyhydric alcohols and may be for example glycerin, 1,2,3-butanetriol, 1,2,4-butanetriol, erythritol, ribitol, xylitol, dulcitol, sorbitol, 1,2,3-cyclohexatriol, inositol, glucose, galactose, mannose, galacturonic acid, xylose, glucosamine, galactosamine, 1,1,2,2-tetramethyloylcyclohexane, 1,1,1-trimethylolpropane, 1,1,2-trimethylolpropane, 1,1,1-trimethylolbutane, 1,1,2-trimethylolbutane, 1,1,1-trimethylolpentane, 1,1,2-trimethylolpentane, 1,2,2-trimethylolpentane, trimethylolpentane, pentaerythritol, dipentaerythritol, 1,1,3,3-tetrahydroxypropane, 1,1,5,5-tetrahydroxypentane, 2,2,6,6-tetrakis(hydroxymethyl)cyclohexane and 2,2,6,6-tetrakis(hydroxymethyl)cyclohexanol.

The polyhydric alcohol is for instance starch, cellulose or a sugar or a sugar alcohol.

The polyhydric alcohols include degraded starch (dextrins and cyclodextrins), maltose and its derivatives, maltitol, maltopentaose hydrate, maltoheptaose, maltotetraose, maltulose monohydrate, D,L-glucose, dextrose, sucrose and D-mannitol.

Commercial polyhydric alcohols include trimethylol propane, triethylol propane, glycerol, sorbitol and pentaerythritol.

The aldehyde scavengers are for instance as disclosed in U.S. Pat. Nos. 6,908,650 and 7,022,390, each incorporated by reference. The aldehyde scavengers are for example dialkyl hydroxylamines of the formula

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms; and $T_2$ is hydrogen, or independently has the same meaning as $T_1$.

The hydroxylamines are for instance N,N-dihydrocarbyl-hydroxylamines selected from N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow)hydroxylamine.

Phenolic Antioxidants

Phenolic antioxidants are known and are for instance:

Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

Tocopherols, for example α-tocopherol, β-tocopherol, γ-tocopherol, δ-tocopherol and mixtures thereof (Vitamin E).

Hydroxylated thiodiphenyl ethers, for example 2,2'-thiobis (6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1, 5,5-tetra-(5-tert-butyl-4-hydroxy-2-methylphenyl)pentane.

O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1, 3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

Acylaminophenols, for example 4-hydroxylauranilide, 4-hydroxystearanilide, octyl N-(3,5-di-tert-butyl-4-hydroxyphenyl)carbamate.

Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of β-(5-tert-butyl-4-hydroxy-3-methylphenyl)propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Nau-gard®XL-1 supplied by Uniroyal).

For instance, the phenolic antioxidant is:

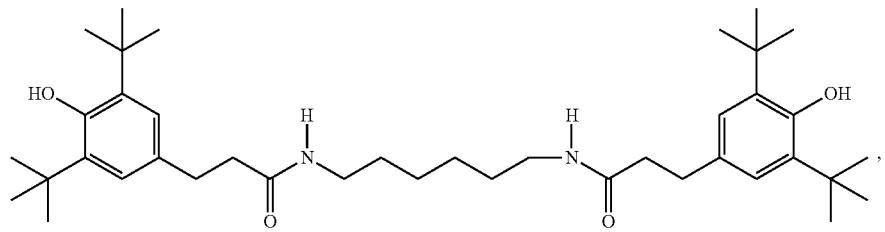

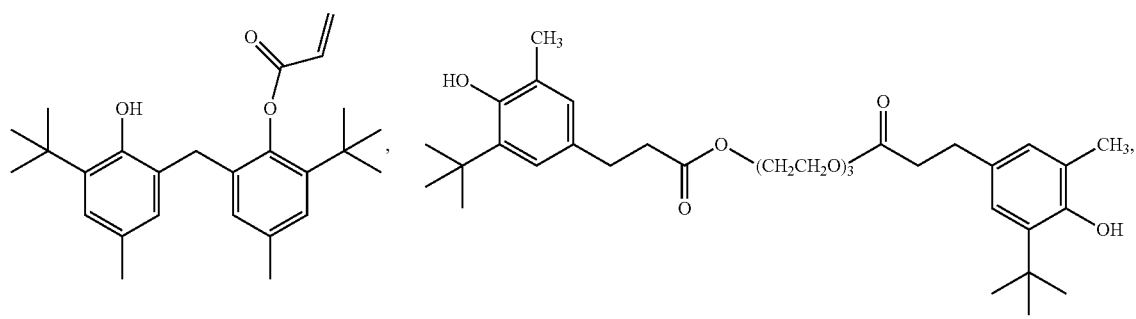

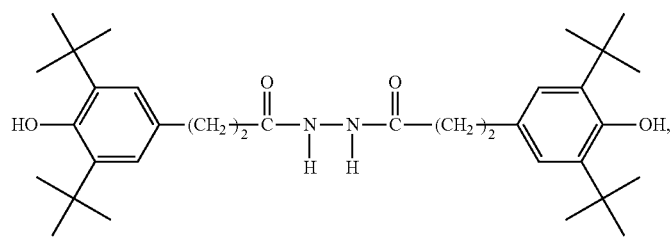

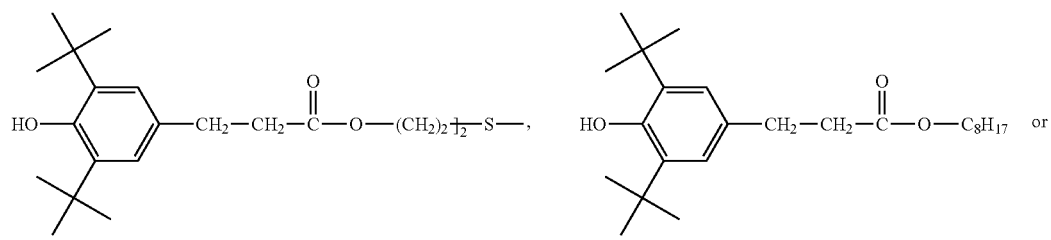

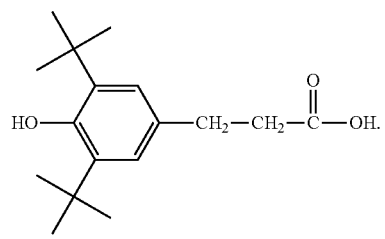

Included as phenolic antioxidants are monoacrylate esters of 2,2'-alkylidenebisphenol. These are for example of the formula

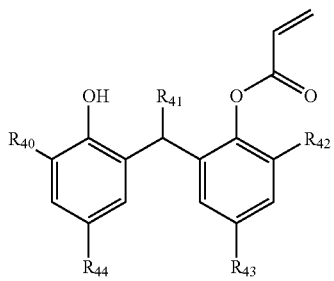

wherein $R_{40}$, $R_{41}$, $R_{42}$, $R_{43}$ and $R_{44}$ are independently straight or branched chain alkyl of 1 to 18 carbon atoms, cycloalkyl of 5 to 12 carbon atoms or phenylalkyl of 7 to 15 carbon atoms.

The monoacrylate esters are for example monoacrylate esters of compounds selected from the group consisting of 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis (4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 2,6-bis(3-tert-butyl-5-methyl-2-hydroxybenzyl)-4-methylphenol and 1,1-bis-(3,5-dimethyl-2-hydroxyphenyl)butane.

The monoacrylate ester of 2,2'-methylenebis(6-tert-butyl-4-methylphenol), available from Ciba Specialty Chemicals as Irganox® 3052, is a specific example:

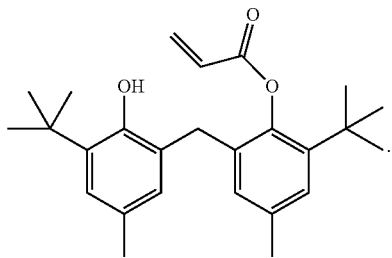 [SMILES: C=CC(=O)Oc1c(Cc2cc(C)cc(C(C)(C)C)c2O)cc(C)cc1C(C)(C)C]

If any substituents are alkyl, they are for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl. Typical cycloalkyl groups include cyclopentyl and cyclohexyl; typical cycloalkenyl groups include cyclohexenyl; while typical aralkyl groups include benzyl, α-methyl-benzyl, α,α-dimethylbenzyl or phenethyl.

Organic Phosphorus Stabilizers

Organic phosphorus compounds are well known polymer process stabilizers. For Example, Plastics Additives Handbook, 4$^{th}$ Ed., R. Gaechter, H. Mueller, Eds., 1993, pages 40-71, discusses the stabilization of polypropylene (PP) and polyethylene (PE).

Known phosphite and phosphonite stabilizers include for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, bis(2,4-di-α-cumylphenyl)pentaerythritol diphosphite, diisodecyl pentaerythritol diphosphite, bis(2,4-di-tert-butylphenyl)pentaerythritol diphosphite (D), bis(2,6-di-tert-butyl-4-methylphenyl)pentaerythritol diphosphite (E), bisisodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl) 4,4'-biphenylene-diphosphonite (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2] dioxaphosphocin (A), bis(2,4-di-tert-butyl-6-methylphenyl) methyl phosphite, bis(2,4-di-tert-butyl-6-methylphenyl) ethyl phosphite (G), 2,2',2''-nitrilo[triethyltris(3,3'5,5'-tetra-tert-butyl-1,1'-biphenyl-2,2'-diyl)phosphite] (B), bis(2,4-di-t-butylphenyl)octylphosphite, poly(4,4'-{2,2'-dimethyl-5,5'-di-t-butylphenylsulfide-}octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite),

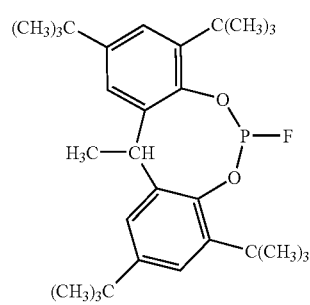

(A)

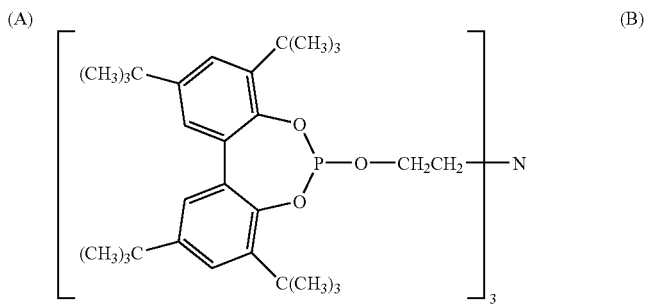

(B)

-continued
(C)
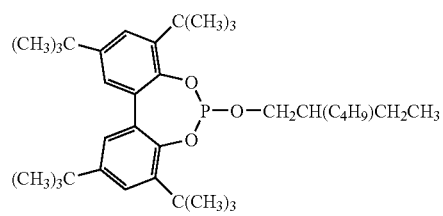
(D)
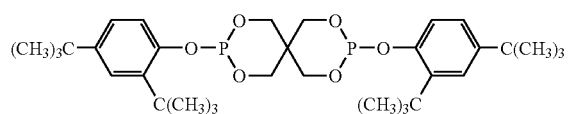
(E)
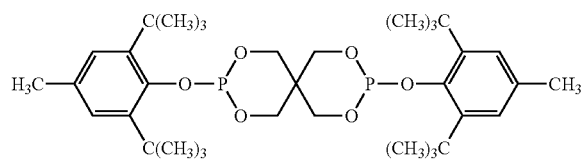
(F)
(G)
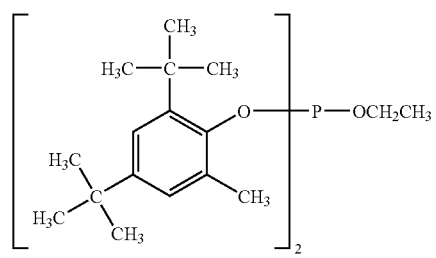
(H)
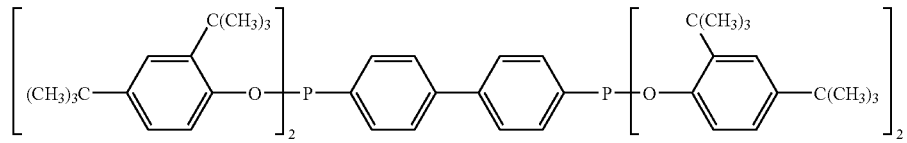
(J)
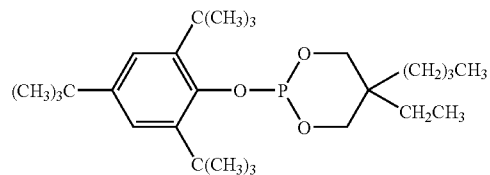
(K)
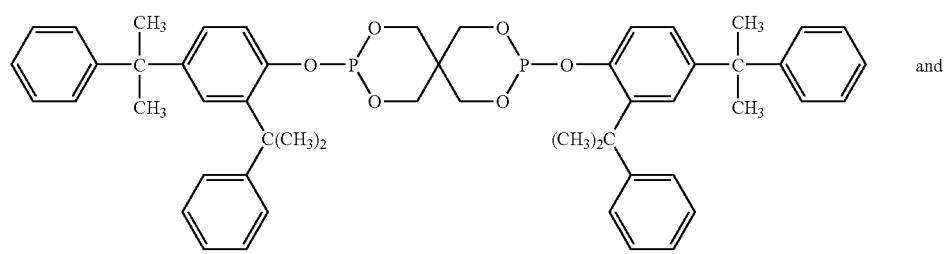
and
(L)
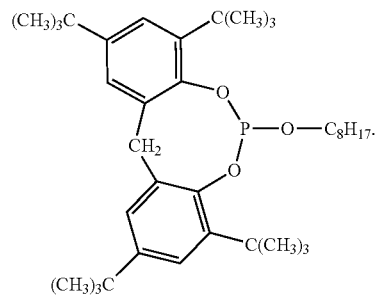

The organic phosphorus compounds are for instance di-hydrocarbyl hydrogen phosphonates of the general formula $(RO)_2P(=O)H$. Each R independently is defined as hydrocarbyl. For instance, the di-hydrocarbyl hydrogen phosphonates are diethyl phosphonate, distearyl phosphonate, dibenzyl phosphonate, di(2-ethylhexyl)phosphonate, di-n-octylphosphonate,

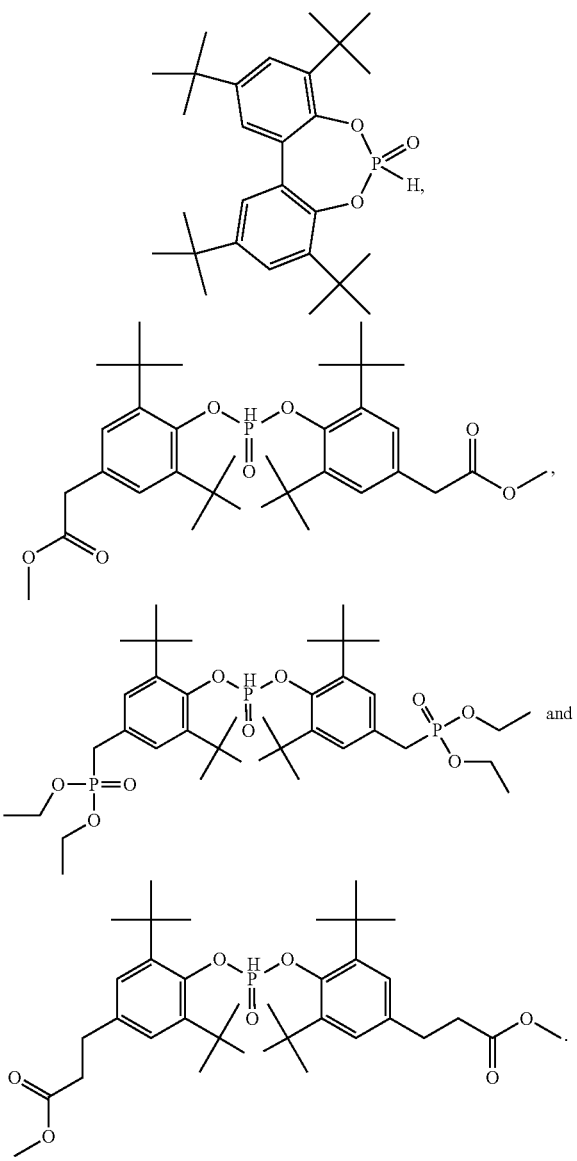

Dibenzyl phosphonate is

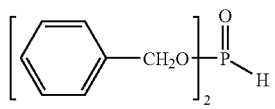

Di-hydrocarbyl hydrogen phosphonates are disclosed for instance in U.S. Pat. No. 4,433,087, incorporated herein by reference.

Di-hydrocarbyl means substituted with two hydrocarbyl (R) groups. The hydrocarbyl groups are for instance phenyl or alkyl or phenylalkyl groups. Phenyl groups are unsubstituted or substituted one to three times with $C_1$-$C_8$alkyl groups or with alkyl groups interrupted with a COO or a OPOO group as set forth in the structures above. Alkyl is for example straight or branched $C_1$-$C_{24}$alkyl. Phenylalkyl is for example benzyl. The two hydrocarbyl groups may be linked as in the first structure above.

Di-hydrocarbyl hydrogen phosphonites are compounds of general formula RO—(R)—P(=O)H. Each R is independently defined as hydrocarbyl. The phosphonite compounds are for instance analogues of the above phosphonates. Such phosphonites are disclosed for example in U.S. Pat. Nos. 4,940,772, 5,717,127 and 5,734,072, each incorporated herein by reference. The compound 9,10-dihydro-9-oxa-10-phosphaphenanthrene 10-oxide is an example:

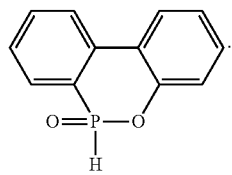 [SMILES: O=[PH]1Oc2ccccc2-c2ccccc21 ; "."]

Lactone Stabilizers

Lactone (benzofuranone) stabilizers are known and are described for example in U.S. Pat. No. 6,521,681, incorporated herein by reference.

For instance, the lactones are 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis (5,7-di-tert-butyl-3-(4-(2-hydroxyethoxy)phenyl) benzofuran-2-one), 5,7-di-tert-butyl-3-(4-ethoxyphenyl) benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one, 5,7-di-tert-butyl-3-phenyl-3H-benzofuran-2-one, 5,7-di-tert-butyl-3-(5,6,7,8-tetrahydro-2-naphthalenyl)-(3H)-benzofuran-2-one or 5,7-di-tert-butyl-3-(4-methoxyphenyl)-3H-benzofuran-2-one.

For example, the lactones are selected from:

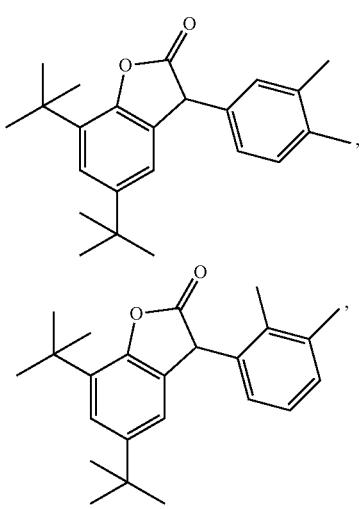

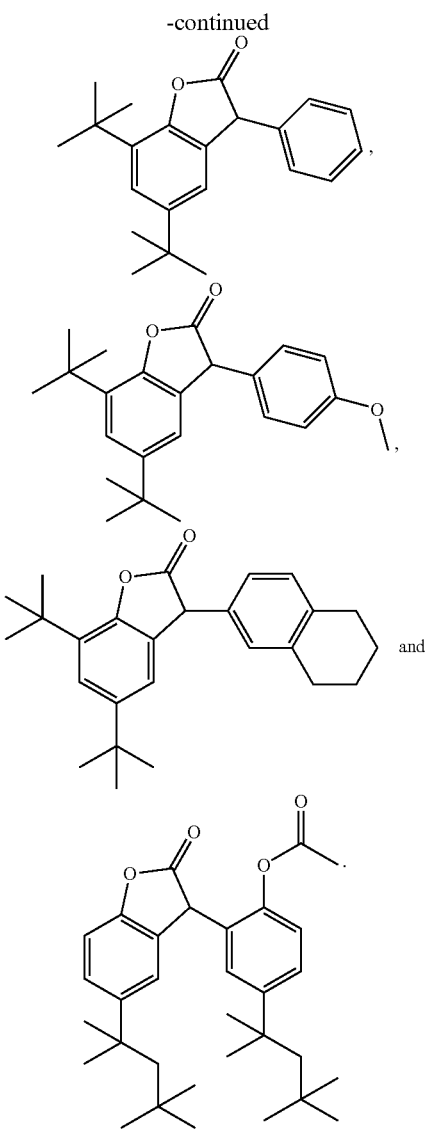

and

The present polyester-polyamide blends are for example a blend of polyethylene terephthalate (PET) and polyamide-MXD6.

The blends are formed for example as described in U.S. 2004/0013833, U.S. 2007/0093616 and/or U.S. 2008/0009574, each incorporated by reference.

The term blend means a mixture. The blend may be a melt blend, a dry blend or a compartmentalized blend. The blend comprises a mixture of polyester, polyamide and additives A) or B).

The blend is for example a melt blend, for instance a polymer blend produced in the melt phase and extruded into pellets, in other words, melt compounded into pellets. Melt compounding takes place for instance in a single or twin-screw extruder.

The melt blend may be formed into pellets for further forming steps or may be formed directly from the melt into the final product, that is bottle, container, preform, film, fiber or sheet.

The pellets ultimately are molded to form a monolayer or a multilayer preform, container, bottle, food packaging film, fiber or sheet. This process involves for example injection molding, melt extrusion or thermoforming.

The blend is formed for example by an intimate melt blend of the polyester, polyamide and additives. Alternatively, the blend may be formed by coextrusion to form a compartmented multiple phase pellet where the polyester and polyamide are in separate physical phases, as taught in U.S. 2007/0093616. In this case, the additives of the invention may be in either the polyester phase, in the polyamide phase, or in both the polyester and polyamide phases. Such compartmented blends as well as intimate blends are "melt blends" of the present invention.

The blend may be a dry blend of polyester, polyamide and additives A) or B) intended for further downstream use.

The term "heat processing" is inclusive of melt blending. Heat processing means for instance extrusion compounding, coextrusion, thermoforming, oven drying, solid state polymerization (SSP), multiple phase pellet formation, preform molding, bottle blowing, reprocessing (extrusion or injection molding) of recycled materials or scrap or sanitization of recyclate or scrap.

The blends of the present invention are employed to form molded articles such as preforms, beverage and food rigid bottles or containers or food packaging films or fibers or sheets. The articles are monolayer or multilayer constructions. The blends may be of virgin polymer or of recycled material or scrap.

The molded articles are in particular transparent articles, for example clear articles that contain no pigment or only a minor amount of pigment.

Also subject of the present invention are molded articles comprising the present polymer blends.

The present molded articles, in addition to exhibiting low color, low haze and high whiteness/brightness, also exhibit excellent organoleptics and gas barrier (oxygen) properties.

The weight ratio of polyester to polyamide is for example from about 99:1 to about 75:25, for instance from about 98:2 to about 85:15. For instance the weight ratio of polyester to polyamide is about 95:5, 97:3 or 96:4.

The weight level of each of the additives of A) or B) is from about 0.01 percent to about 5 percent by weight, based on the weight of polyester plus polyamide. For instance, the weight level is about 0.025 percent, 0.05 percent, 0.075 percent, 0.1 percent, 0.25 percent or 0.5 percent, based on the weight of polyester plus polyamide. For instance, the weight level is about 0.02, 0.03, 0.04, 0.05, 0.1, 0.2, 0.3, 0.4 or about 0.5 percent by weight, based on the weight of polyester plus polyamide. Ranges between these various weight percents are included.

The compositions may comprise further additives, especially compatibilizers and oxygen scavengers.

Oxygen scavengers are disclosed for instance in U.S. Pat. No. 7,049,359, incorporated by reference.

Further possible additives include preform heat up rate enhancers, friction reducing additives, UV absorbers, inert particulate additives (clays or silicas), colorants, branching agents, flame retardants, crystallization control agents, impact modifiers, catalyst deactivators, melt strength enhancers, anti static agents, lubricants, chain extenders, nucleating agents, solvents, fillers and plasticizers.

The further additives are employed at the same weight levels as the additives of components A) and B).

Both passive and active packaging compositions are contemplated in this invention. Passive barrier systems means a PET blended with another component(s) which retards the migration of gas (oxygen) into a container. Active barrier systems incorporate an oxidizable material which reacts or scavenges oxygen as it migrates through the package wall thus reducing oxygen transmission into the package. The oxygen scavenging materials may be an oxidizable inorganic material such as cobalt, iron or aluminum as described in U.S. 2008/082157. The oxygen scavenging materials may be an oxidizable organic component either blended or reacted into PET as described in U.S. Pat. No. 7,049,359, U.S. 2006/0180790, U.S. 2008/0277622, U.S. 2008/0171169, U.S. Pat. Nos. 6,509,436, 6,139,770, 6,083,585 and 5,310,497, and further a catalyst may be used to accelerate the onset or rate of oxidation of the organic component as taught therein.

The following Examples further illustrate the invention. Unless otherwise indicated, all parts and percentages are by weight.

EXAMPLES

General

PET from M&G CLEARTUF 8006, bottle grade PET copolymer IV 0.80.

Nylon MXD-6 from Mitsubishi Gas Chemical Advanced Polymers Inc., Grade S6007, CAS #25718-70-1

PET and polyamide MXD-6 are dried in vacuum at 100-120° C. to moisture <50 ppm. A mixture of 95:5 wt/wt PET/MXD6 pellets are prepared, and additives are added as a solution to the combined polymer pellets. Extrusion of the mixture is conducted on a Liestritz 27 mm corotating twin screw extruder with temperature profile 270-275° C. (throat to die), and die melt temperature 275° C., screw speed 150 rpm. The polymer extrudate is cooled in a water trough and the strand is pelletized. After this first extrusion pass, the polymer is split in two portions. One portion is retained for injection molding. The second portion is redried as above, and then a $2^{nd}$ pass extrusion is conducted on the same extruder and setup conditions. The pelletized extrudate is saved for injection molding.

The weight level of the additive is based on the combined weight of the polyester plus polyamide.

Injection molding is performed using redried polymer blend from acquired from the extrusion passes. A BOY 50 injection molder is equipped with 2"×2"×0.060" mold, and plaques are molded under conditions of injection pressure (900 psi), nozzle temperature (288° C.), mold temperature (70° F.), screw speed (150 rpm).

Color of plaques is measured on a DCI SF600 spectrophotometer per ASTM E313, large area view, spectral component included d/8, D65, 10° C.

The improvement in color for the PET/MXD6 polymer blends prepared in this manner is shown in the Examples below. Comparing the unstabilized PET/MXD6 formulation to the stabilized formulations at each extrusion pass, there is a protection against discoloration for each additive or additive mixture shown.

Example 1

Aldehyde Scavengers Plus Organic Phosphorus Stabilizers

Organic phosphorus stabilizer A and organic phosphorus stabilizer B, bis-(2,4-di-t-butylphenol) pentaerythritol diphosphite, CAS Reg #26741-53-7, are employed together with aldehyde scavenger 1, anthranilamide, as per the general procedure. Yellowness and whiteness of the plaques are measured after 1 pass. The control contains no additive. Results are below.

|  | Yellowness | Whiteness |
|---|---|---|
| Control | 17.0 | 78.6 |
| Aldehyde Scavenger 1 (0.05%) | 10.4 | 81.1 |
| Phosphorus Stabilizer A (0.025%) | 10.1 | 79.8 |
| Phosphorus Stabilizer B (0.025%) | 10.0 | 81.6 |
| Aldehyde Scavenger 1 (0.05%) + Phosphorus Stabilizer A (0.025%) | 6.3 | 78.3 |
| Aldehyde Scavenger 1 (0.05%) + Phosphorus Stabilizer B (0.025%) | 8.5 | 81.4 |

Example 2

Aldehyde Scavenger Plus Organic Phosphorus Stabilizer

Organic phosphorus stabilizer A and aldehyde scavenger 2, N,N'-1,6-hexanediylbis(2-amino-benzamide), CAS Reg #103956-07-6, are employed together as additives as per the general procedure. The control contains no additives. Yellowness is measured on the plaques after 1 pass. Results are below.

|  | Yellowness |
|---|---|
| Control | 11.3 |
| Aldehyde Scavenger 2 (0.025%) | 10.6 |
| Aldehyde Scavenger 2 (0.025%) + Phosphorus Stabilizer A (0.025) | 6.5 |

Example 3

Lactone Stabilizer Plus Aldehyde Scavenger or Plus Organic Phosphorus Stabilizer Lactone 4 is tested together with aldehyde scavenger 1 and with phosphorus stabilizer A as per the general procedure. The plaques are measured for yellowness (b*) and whiteness (L*) after 1 extrusion pass. The control contains no additive. The results are below.

|  | Yellowness | Whiteness |
|---|---|---|
| Control | 11.3 | 77.1 |
| Lactone Stabilizer 4 (0.025%) plus Aldehyde Scavenger 1 (0.05%) | 10.0 | 74.7 |
| Lactone Stabilizer 4 (0.05%) plus Phosphorus Stabilizer A (0.025%) | 6.3 | 78.7 |

Example 4

Aldehyde Scavenger Plus Phenolic Antioxidant

Examples 1 and 2 are repeated with aldehyde scavengers 1 and 2 and with phenolic antioxidant A in place of the phosphorus stabilizer. Excellent results are achieved.

Example 5

Lactone Stabilizer Plus Aldehyde Scavenger

Example 1 is repeated with aldehyde scavenger 1 and with lactone stabilizers 1-3 in place of the phosphorus stabilizer.

Example 1 is repeated with aldehyde scavenger 2 and with lactone scavengers 1-4 in place of the phosphorus stabilizer. Excellent results are achieved.

Example 6

Lactone Stabilizers Plus Phosphorus Stabilizers

Example 3 is repeated with lactone stabilizers 1-3. Excellent results are achieved.

Example 7

Lactone Stabilizers Plus Phenolic Antioxidants

Example 3 is repeated with lactone stabilizers 1-4 and with phenolic antioxidant A in place of the aldehyde scavenger and the phosphorus stabilizer. Excellent results are achieved.

The additives of the Examples are:

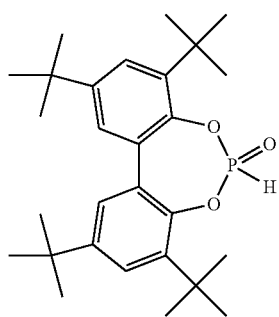

Phosphorus Stabilizer A

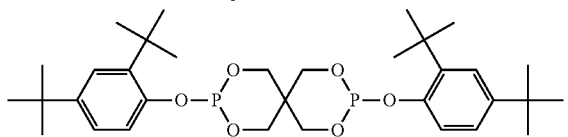

Phosphorus Stabilizer B

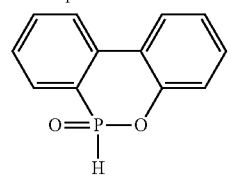

Phosphorus Stabilizer C

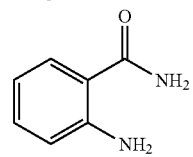

Aldehyde Scavenger 1

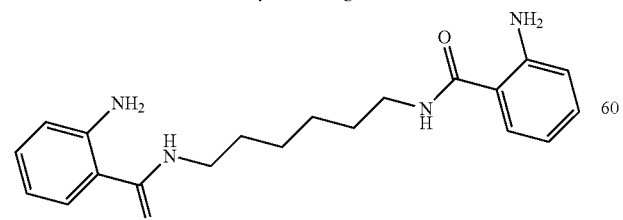

Aldehyde Scavenger 2

-continued

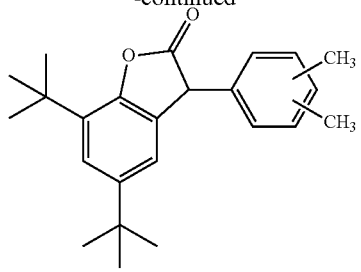

Lactone Stabilizer 1

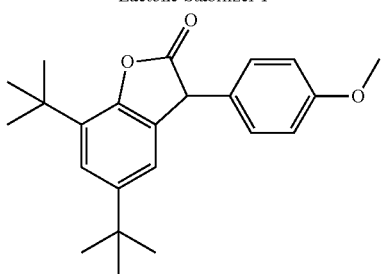

Lactone Stabilizer 2

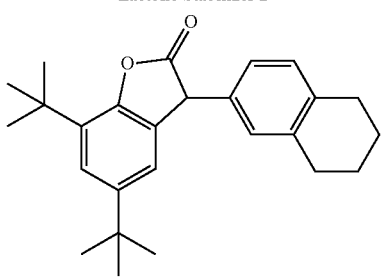

Lactone Stabilizer 3

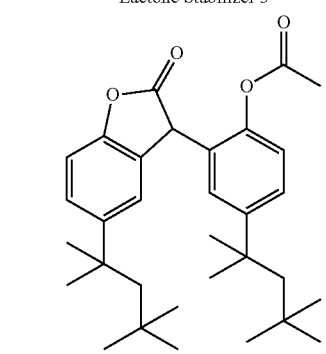

Lactone Stabilizer 4

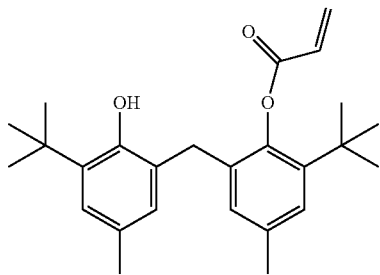

Phenol Antioxidant A

What is claimed:
1. A polymer blend composition susceptible to color and haze formation upon heat processing comprising
at least one polyester and at least one polyamide and

A) a combination of
   a) one or more compounds selected from aldehyde scavengers and
   b) one or more compounds selected from phenolic antioxidants, organic phosphorus stabilizers and lactone stabilizers or
B) a combination of
   c) one or more lactone stabilizers and
   d) one or more compounds selected from phenolic antioxidants and organic phosphorus stabilizers.

2. A composition according to claim 1 where the polyester is PET.

3. A composition according to claim 1 where the polyamide is poly-m-xylylene adipamide.

4. A composition according to claim 1 where the weight ratio of polyester to polyamide is from about 99:1 to about 85:15.

5. A composition according to claim 1 where the additives of components A) or B) are each present from about 0.01 to about 0.3 percent by weight, based on the weight of the composition.

6. A composition according to claim 1 further comprising preform heat up rate enhancers, friction reducing additives, UV absorbers, inert particulate additives, colorants, branching agents, flame retardants, crystallization control agents, impact modifiers, catalyst deactivators, melt strength enhancers, anti static agents, lubricants, chain extenders, nucleating agents, solvents, fillers or plasticizers.

7. A composition according to claim 1 further comprising compatibilizers or oxygen scavengers.

8. A composition according to claim 1 comprising component A).

9. A composition according to claim 8 where the aldehyde scavenger is anthranilamide or N,N'-1,6-hexanediylbis(2-amino-benzamide).

10. A composition according to claim 8 comprising phenolic antioxidants selected from

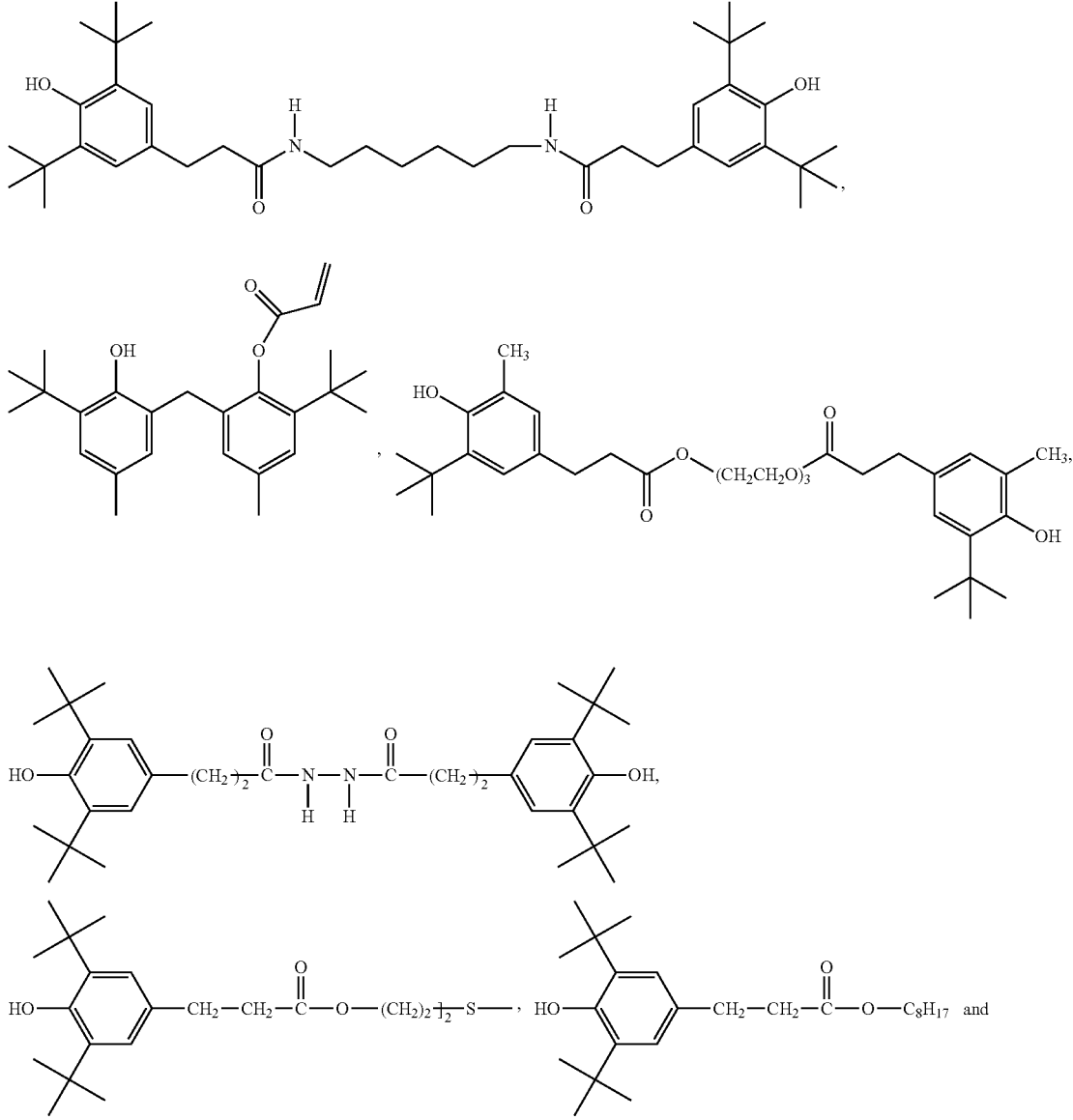

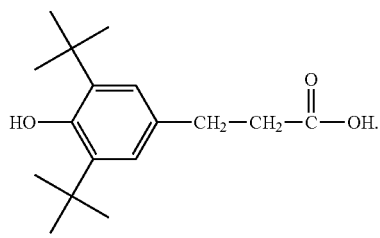
11. A composition according to claim 8 comprising organic phosphorus stabilizers selected from diethyl phosphonate, distearyl phosphonate, dibenzyl phosphonate, di(2-ethylhexyl)phosphonate, di-n-octylphosphonate,
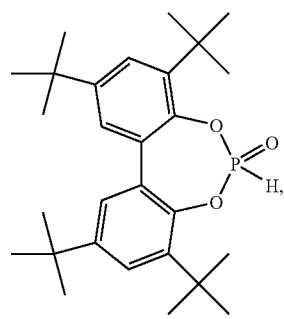
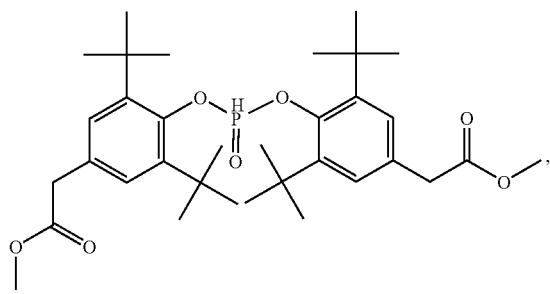
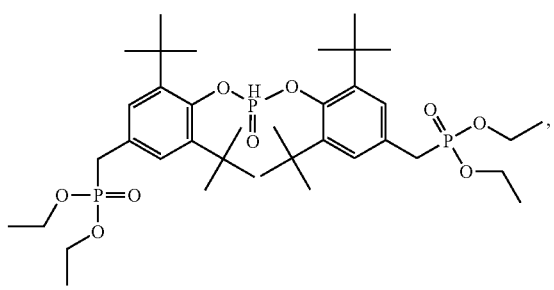
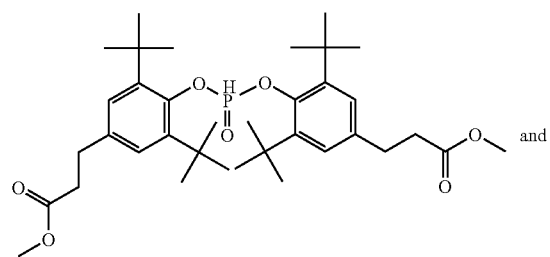
and
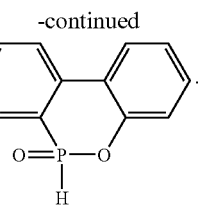
-continued
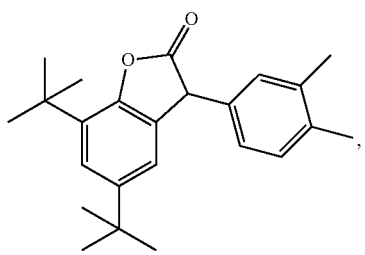
12. A composition according to claim 8 comprising lactone stabilizers selected from
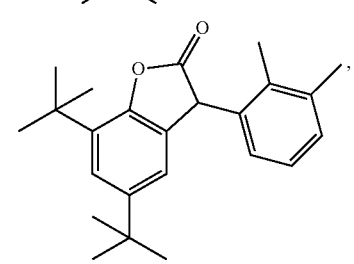
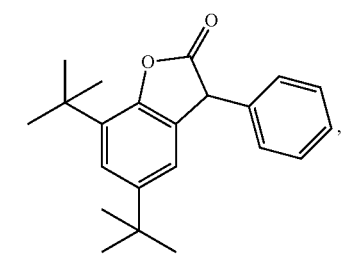
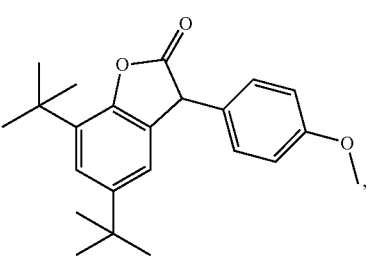

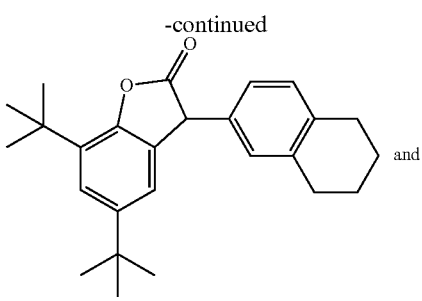
and
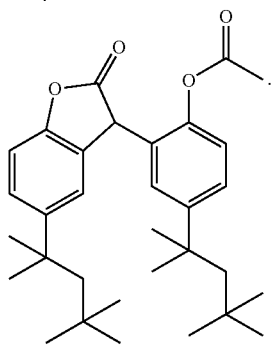
13. A composition according to claim 1 comprising component B).
14. A composition according to claim 13 where the lactone stabilizers are
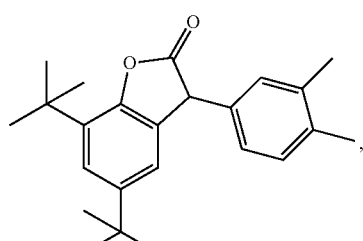
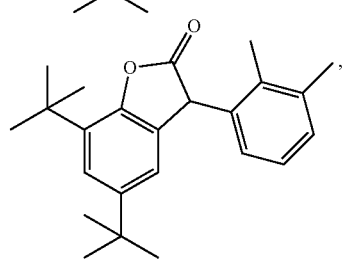
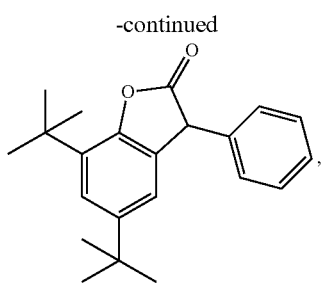
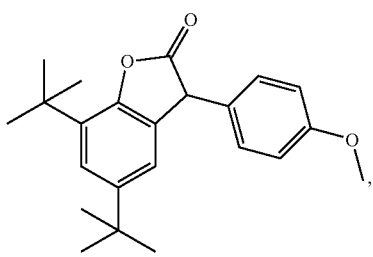
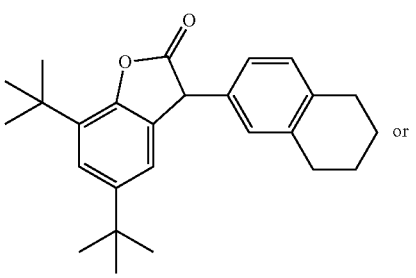
or
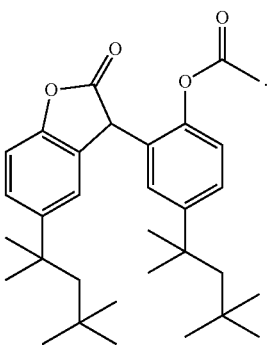
15. A composition according to claim 13 comprising phenolic antioxidants selected from
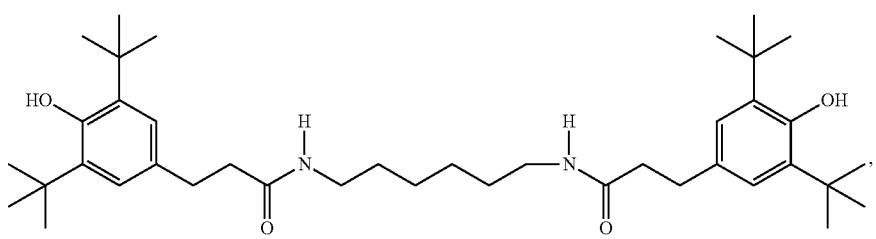

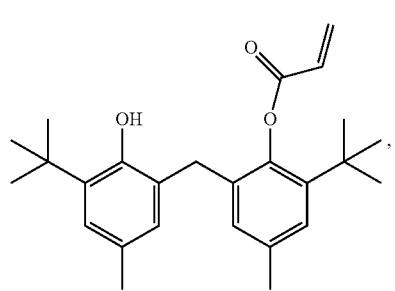
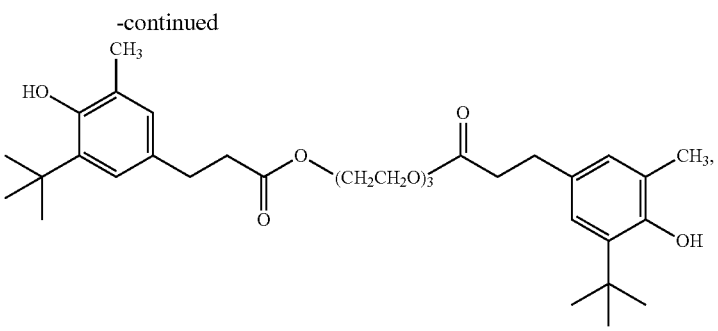
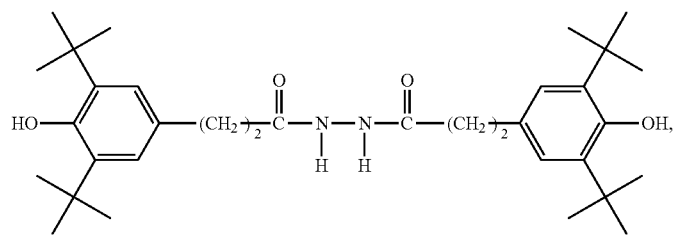
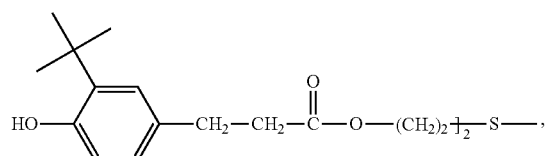
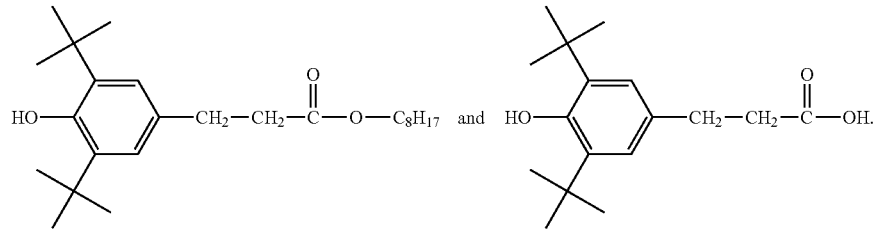
16. A composition according to claim 13 comprising organic phosphorus stabilizers selected from diethyl phosphonate, distearyl phosphonate, dibenzyl phosphonate, di(2-ethylhexyl)phosphonate, di-n-octylphosphonate,
-continued
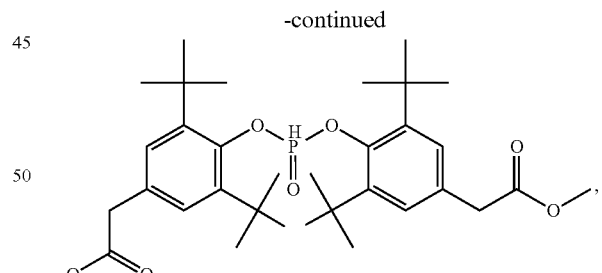
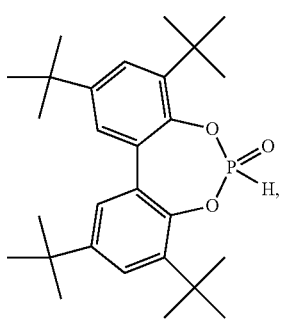
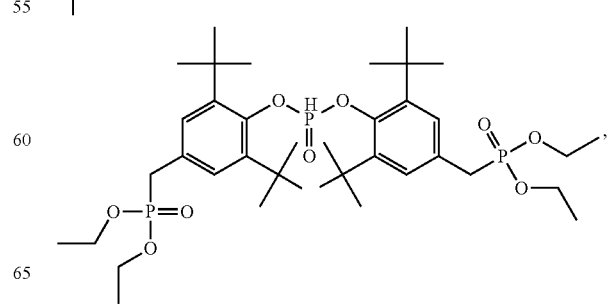

-continued

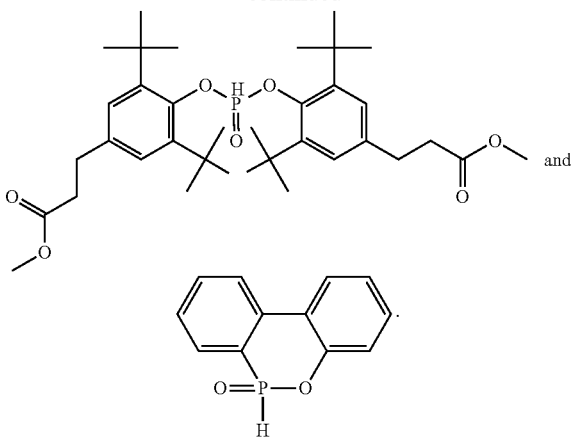
and
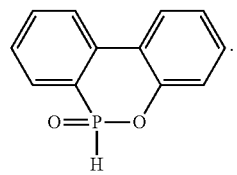
.

17. A process for stabilizing polymer blends against color and haze formation upon heat processing, said process comprising
melt blending a mixture of at least one polyester and at least one polyamide and
A) a combination of
a) one or more compounds selected from aldehyde scavengers and
b) one or more compounds selected from phenolic antioxidants, organic phosphorus stabilizers and lactone stabilizers or
B) a combination of
c) one or more lactone stabilizers and
d) one or more compounds selected from phenolic antioxidants and organic phosphorus stabilizers.

18. A molded article comprising a melt blend of at least one polyester and at least one polyamide and
A) a combination of
a) one or more compounds selected from aldehyde scavengers and
b) one or more compounds selected from phenolic antioxidants, organic phosphorus stabilizers and lactone stabilizers or
B) a combination of
c) one or more lactone stabilizers and
d) one or more compounds selected from phenolic antioxidants and organic phosphorus stabilizers.

19. A molded article according to claim 18 which is a bottle, container or a film.

* * * * *